United States Patent [19]

LiCausi

[11] Patent Number: 5,113,674
[45] Date of Patent: May 19, 1992

[54] ANTI-THEFT DEVICE ADAPTED TO BE MOUNTED TO THE STEERING WHEEL OF A VEHICLE

[76] Inventor: Anthony LiCausi, 78-23 67th Rd., Middle Village, N.Y. 11379

[21] Appl. No.: 690,603

[22] Filed: Apr. 24, 1991

[51] Int. Cl.⁵ .............................................. B60R 25/02
[52] U.S. Cl. ............................................ 70/209; 70/237; 70/212; 70/18
[58] Field of Search ................ 70/225, 226, 237, 238, 70/239, 209, 211, 212, 18, 423, 424, 455, 14

[56] References Cited

U.S. PATENT DOCUMENTS

| | | | |
|---|---|---|---|
| 1,359,729 | 11/1920 | Nichols | 70/211 |
| 1,426,534 | 8/1922 | Baker | 70/226 |
| 1,437,717 | 12/1922 | Brindamour | 70/211 |
| 4,008,589 | 2/1977 | Harrell | 70/18 |
| 4,074,550 | 2/1978 | Rowlings | 70/237 |
| 4,104,895 | 8/1978 | Tankel | 70/424 |
| 4,134,279 | 1/1979 | Ross et al. | 70/18 |
| 4,304,111 | 12/1981 | Nolin | 70/238 X |
| 4,317,346 | 3/1982 | Gutman | 70/424 X |
| 4,538,827 | 9/1985 | Plifka | 70/14 |
| 4,955,215 | 9/1990 | Eremita | 70/237 X |
| 5,025,646 | 6/1991 | Waguespack, Jr. | 70/226 |

Primary Examiner—Renee S. Luebke
Assistant Examiner—Darnell M. Boucher
Attorney, Agent, or Firm—McAulay Fisher Nissen Goldberg & Kiel

[57] ABSTRACT

An anti-theft device is disclosed which is adapted to be mounted to the steering wheel of a vehicle. The device includes a yoke member adapted to be positioned on the steering column. The yoke member includes a key housing shield adapted to cover and protect the key housing on the steering column when the device is mounted in place. The device further includes a bent bracket member having one end adapted to be mounted to the yoke member and another end adapted to engage with a spoke of the wheel to prevent rotation of the steering wheel in a predetermined direction.

24 Claims, 3 Drawing Sheets

ANTI-THEFT DEVICE ADAPTED TO BE MOUNTED TO THE STEERING WHEEL OF A VEHICLE

BACKGROUND OF THE INVENTION

I. Field of the Invention

This invention relates generally to an anti-theft device and, more specifically, to a device adapted to be mounted to the steering wheel of a vehicle to prevent rotation of the wheel. The device also includes a shield to cover the key housing on the steering column to restrict access thereto.

II. Description of the Prior Art

Heretofore, it is known that anti-theft devices are available which are intended to be mounted to the steering wheel of a vehicle to restrict movement of the wheel. Other separate devices are available to cover the key housing on the steering column to restrict access thereto by persons intent on destroying the key housing to disengage its locking mechanism. While such devices have provided some limited measure of theft prevention of vehicles to which they are mounted, the devices often have proven to be difficult to install or mount. Also, there is no known single or unitary device which, when mounted, provides the dual function of both restricting rotational movement of the steering wheel and protecting the key housing on the steering column. The present invention is directed to such a unitary device which achieves this dual function in a manner hereinafter described.

SUMMARY OF THE INVENTION

The anti-theft device of the present invention is adapted to be mounted to the steering wheel of the vehicle. The steering wheel is defined as having a hub, a plurality of spokes extending radially out from the hub, a steering column extending axially back from the hub, and a key housing on the steering column.

The device includes a yoke member adapted to be positioned on the steering column, and a bent bracket member having one end adapted to be mounted to the yoke member and another end adapted to engage with a spoke of the steering wheel. The yoke member includes a U-band segment having upper and lower legs joined together by a base portion. The upper and lower legs extend respectively across the upper and lower surfaces of the steering column when the device is mounted to the wheel. Each of the upper and lower legs of the U-band has an opening in the end portion thereof. A shield is mounted on the yoke member which is disposed to cover the key housing on the steering column when the device is mounted in place. A positioning bracket also is mounted on the yoke member which is adapted to be received in a space between the hub and the steering column to provide axial positioning of the device on the steering wheel.

The bent bracket member includes a vertical leg which terminates in the end portion thereof that is mounted to the yoke member. Specifically, the leg end of the bracket member extends through the openings in the leg ends of the U-band segment. The leg end of the bracket member also is formed having an opening adapted to receive the hasp of a lock. The other end of the bent bracket member is provided with a foot that is positioned in the path of arcuate travel of the wheel spokes upon rotation of the wheel. The bent bracket member also includes a connecting segment which serves to connect the foot and the vertical leg portion.

When the device is mounted to the steering wheel with the vertical leg of the bent bracket member in engagement with the U-band segment of the yoke members, a forwardly extending portion of the connecting segment of the bracket member engages a wheel spoke to prevent rotation of the wheel in a predetermined direction. With the device so mounted, the shield of the yoke member covers the key housing on the steering column to prevent access thereto.

Additional features and advantages of the present invention will become more apparent from a consideration of the following detailed description when taken in conjunction with the accompanying drawings.

DESCRIPTION OF THE PREFERRED EMBODIMENT

Figure 1:
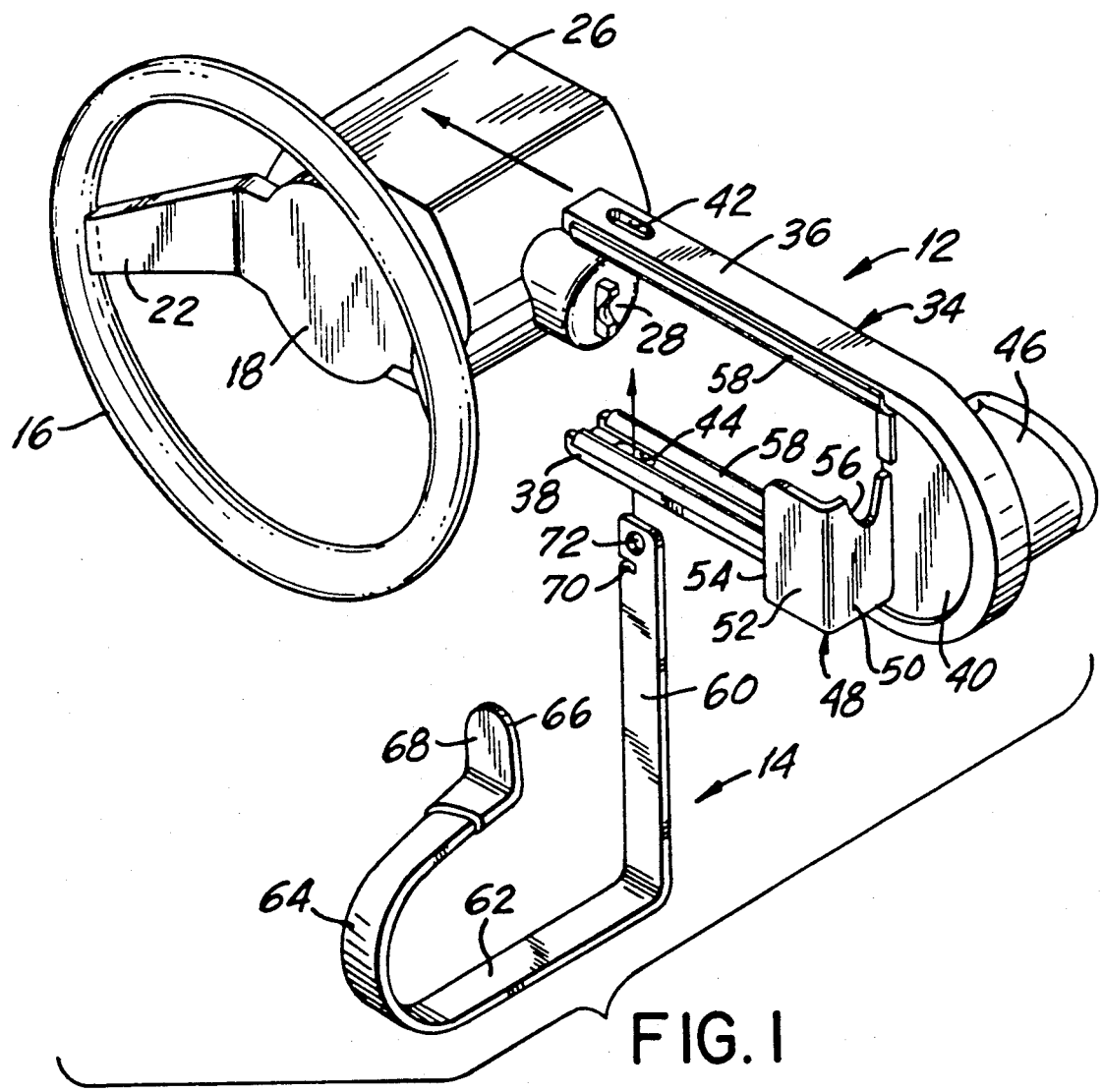
FIG. 1 is an exploded perspective view of the anti-theft device constructed in accordance with the present invention showing the manner in which it is to be mounted to the steering wheel and the associated steering column of the wheel.

Referring to the drawings, numeral 10 represents an anti-theft device constructed in accordance with the present invention adapted to be mounted to the steering wheel of a vehicle. Referring to FIG. 1, device 10 consists of two separate elements represented by a yoke member 12 and a bent bracket member 14. Also shown in FIG. 1 is a steering wheel 16 of a vehicle (not shown) having a central hub 18. A pair of spokes 20 and 22 extends radially out from hub 18 and connects with steering wheel 16. Hub 18 include a collar 24 (best seen in FIG. 2) which extends axially back from the rear surface of the hub. A steering column 26 extends axially back from hub 18 and a key housing 28 is provided on steering column 26. A drive shaft sleeve 30 passes through steering column 26 which houses a drive shaft (not shown) operatively connected to steering wheel 16. A space 32 is provided between the back surface of hub 18 and the front surface of steering column 26 for reasons that will become hereinafter apparent. The inter-relationship and function of steering wheel 16, steering column 26 and key housing 28 are well known in terms of operating the vehicle and require no specific or further description. They form no part of the present invention other than as illustrative of how the anti-theft device 10 is to be mounted to the steering wheel 16.

With continued reference to FIG. 1, yoke member 12 includes a U-band segment 34 made of steel having an upper leg 36 and a lower leg 38 interconnected or joined by a base 40. Legs 36 and 38 are substantially parallel to each other. An opening 42 is formed in upper leg 36 and a opening 44 is formed in lower leg 38. Openings 42 and 44 are in substantial alignment with each other and are disposed to receive one end of the bent bracket member 14 when device 10 is mounted to steering wheel 16 as hereinafter described.

A key housing shield 46 is mounted on base 40 of yoke member 12. Shield 46 extends back from base 40 and is cup-shaped to cover the key housing 28 on steering column 26 when device 10 is mounted in place as hereinafter described.

Also mounted on yoke member 12 is a positioning bracket 48 having a first leg 50 extending forward from base 40 and a second connected leg 52 extending in the same direction as legs 36 and 38 of U-band segment 34. Bracket leg 52 is thus spaced from base 40 and lies in a plane substantially parallel to the plane of base 40.

Bracket leg 52 has a side edge 54 which is received within the space 32 between hub 18 and steering column 26 when device 10 is mounted in place. A notch 56 is formed in the upper edge of bracket leg 50 to accommodate or permit passage of a post (not shown) which would extend outwardly from steering column; such as, for example, would be the case of a turn signal activating post.

Each of the legs 36 and 38 of U-band segment 34 is of channel-shape for added strength. The legs of the channels are covered with a protective trim 58 to protect the steering column 26 from scratching when device 10 is mounted in place.

Figure 2:
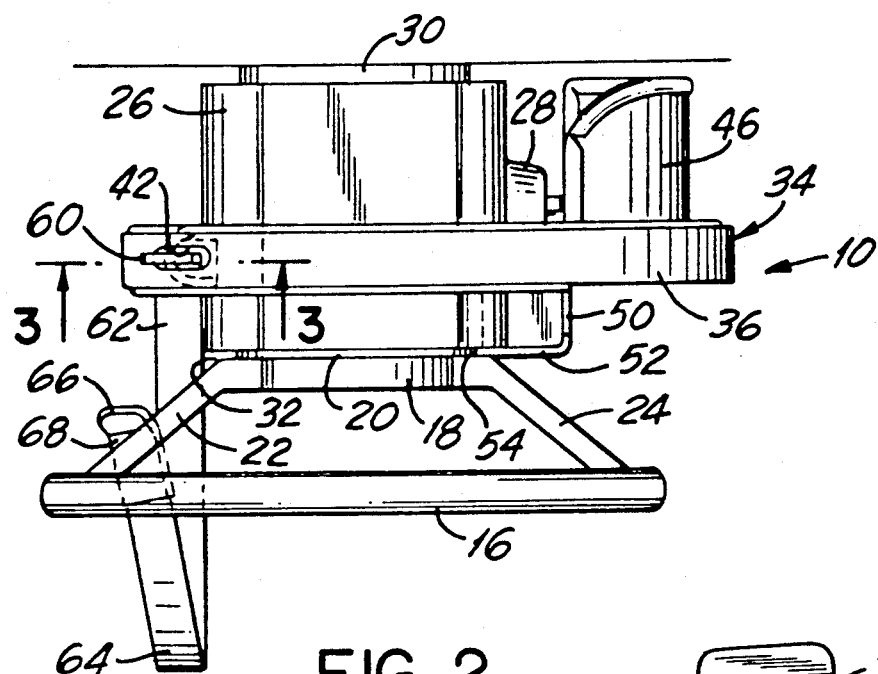
FIG. 2 is a top plan view of the anti-theft device mounted to the steering wheel.
Figure 3:
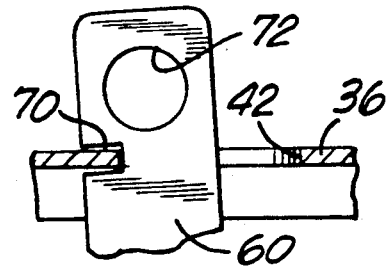
FIG. 3 is a sectional view taken along line 3—3 of FIG. 2.
Figure 4:
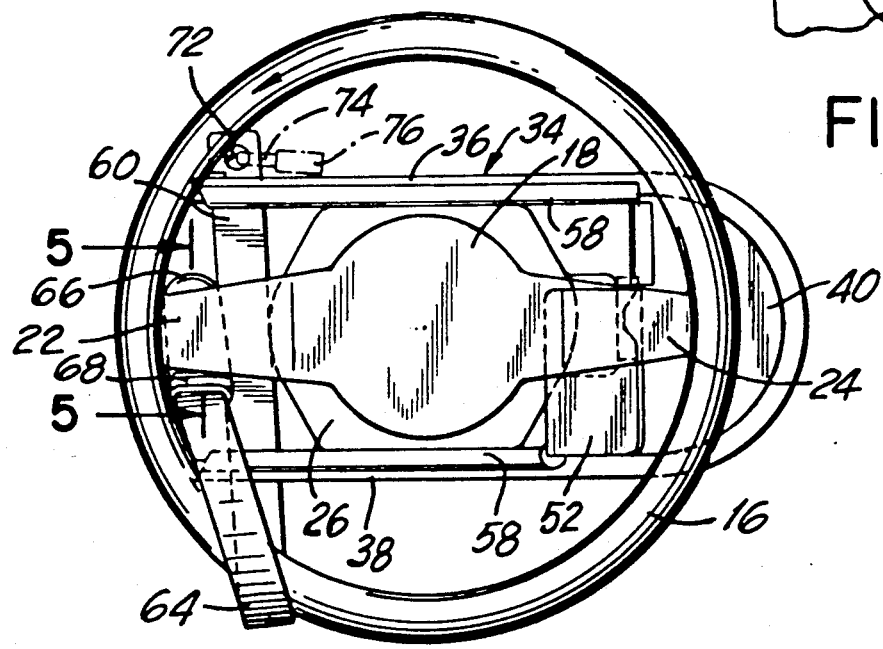
FIG. 4 is a front elevational view of the anti-theft device mounted to the steering wheel to prevent rotation of the wheel in a counterclockwise direction.

The bent bracket member 14 also is made of steel and is formed having a vertical leg 60, a horizontal leg 62, a curved segment 64 and a vertical foot 66. The curved segment 64 and the horizontal leg 62 function as a connecting segment which serves to connect foot 66 to vertical leg 60 in spaced-apart relation. Leg 60 and foot 66 are substantially parallel to each other. Also, as shown in FIGS. 2 and 4, curved segment 64 is slightly twisted to locate foot 66 at a position to the left of the vertical plane in which lie legs 60 and 62. This off-set relation of foot 66 relative to legs 60 and 62 assists in locating foot 66 behind the spoke of the steering wheel, adjacent the wheel, as hereinafter described. A vinyl protective covering 68 is fitted over foot 66 to protect the steering wheel spokes 22 and 24 when device 10 is mounted in place. A notch or slot 70 is formed in vertical leg 60 adjacent the free end thereof. Slot 70 is positioned to receive an edge portion defining the opening 42 in U-band leg 36 when bracket 14 is mounted to yoke member 12 as shown in FIG. 3. Also, an opening 72 is formed in leg 60 adjacent the free end thereof and above slot 70 for receiving the hasp 74 of a lock 76 shown in phantom in FIG. 4.

In mounting device 10 to steering wheel 16, yoke member 12 is positioned with U-band segment 34 spanning across steering column 26. That is, yoke 12 is mounted in the direction of the arrow shown in FIG. 1 to locate column 26 between upper leg 36 and lower leg 38. The mounting arrangement is such that protective trim 58 of upper leg 36 rests on the top or upper surface of steering column 26. The upper leg 36 thus may be thought of as providing vertical positioning of device 10 on steering wheel 16. With yoke member 12 so mounted, shield 46 covers key housing 28, as shown in FIG. 2, to prevent access to the key housing when device 10 is mounted in place. Also, bracket edge 54 of positioning bracket 48 is received within the space 32 between the rear surface of hub 18 and the front surface of steering column 26. This serves to provide axial positioning of device 10 to steering wheel 16. If, at the same time, bracket edge 54 is positioned to contact hub collar 20, then the mounting of yoke member 12 as described also provides lateral positioning of device 10 relative to steering wheel 16. With yoke 12 so mounted, the free ends of upper and lower legs 36 and 38 containing the respective openings 42 and 44 are now positioned on the far side of steering column 26.

Bracket member 14 is now positioned with steering wheel 16 received between vertical leg 60 and curved segment 64. Bracket member 14 is moved upwardly in the direction of the arrow shown in FIG. 1 to cause the free end of vertical leg 60 to pass through the aligned openings 44 and 42 in the lower and upper legs 38 and 36, respectively, of U-band segment 34. Such movement of bracket 14 serves to locate vertical foot 66 behind spoke 22 of steering wheel 16 adjacent the inner edge of the wheel. The movement is such as to capture and hold the spoke of the wheel in the region where the spoke has a lesser width as compared to the spoke width adjacent the hub. Capturing of the spoke adjacent the hub may present a problem if the hub is overly wide to accommodate other features of the vehicle; such as an air bag. As the end of bracket leg 60 passes through U-band leg opening 42, leg 60 is moved laterally to the left, as shown in FIG. 3, to locate an edge portion defining said opening 42 in slot 70 thereby to couple bracket 14 to yoke member 12. With the components thus coupled, the opening 72 in leg 60 is exposed to receive the hasp 74 of a lock 76 as shown in FIG. 4.

Figure 5:
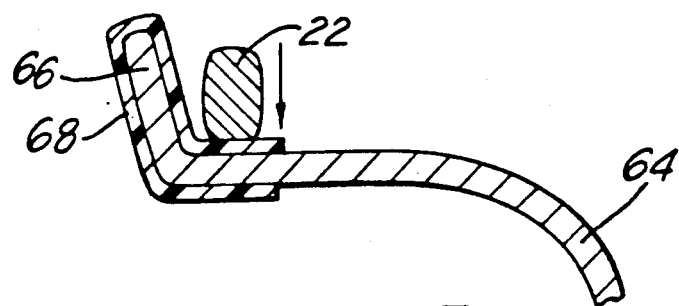
FIG. 5 is a sectional view taken along line 5—5 of FIG. 4.

The coupling of bracket 14 to yoke 12 serves to locate a forwardly extending portion of curved segment 64 in the path of arcuate travel of wheel spokes 22 and 24 upon rotation of steering wheel 16. This is evident in FIGS. 2, 4 and 5 wherein foot 66 captures wheel spoke 22 upon counterclockwise rotation of wheel 16 as represented by the arrow in FIG. 4. At this point, spoke 22 engages a portion of bracket 14 adjacent foot 66, as shown in FIG. 5, to prevent continued rotation of wheel 16 in the counterclockwise direction.

Figure 6:
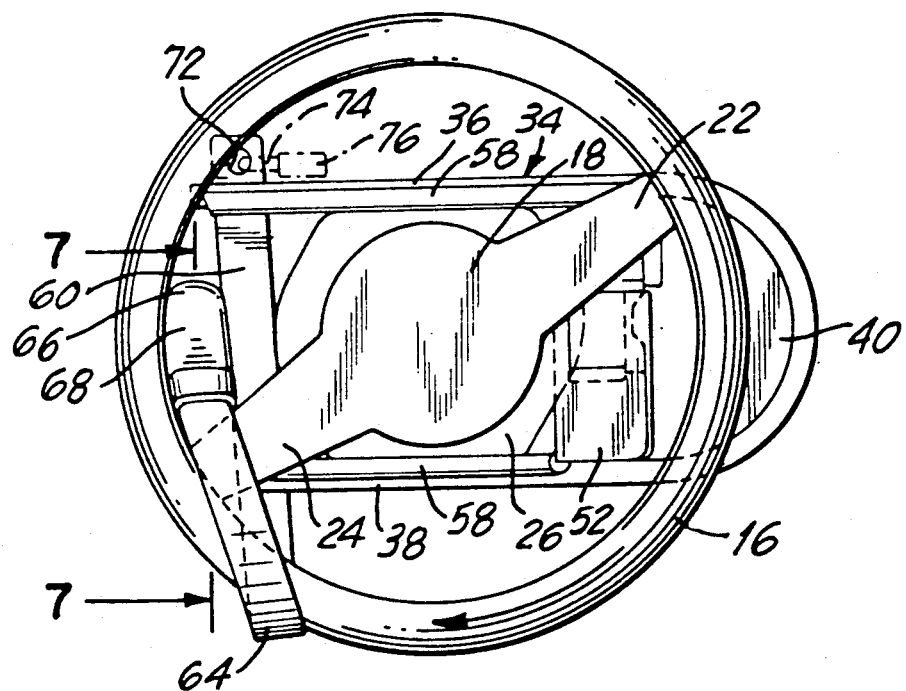
FIG. 6 is a view similar to FIG. 4 showing the steering wheel in a position to prevent rotation thereof in a clockwise direction.
Figure 7:
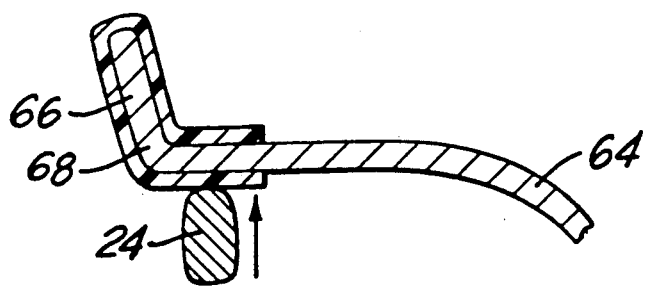
FIG. 7 is a sectional view taken through line 7—7 of FIG. 6.

It also will be appreciated that there is only limited rotation of steering wheel 16 permitted in the clockwise direction. For example, with reference to FIGS. 6 and 7, clockwise rotation of wheel 16 takes place only until wheel spoke 24 engages the underside portion of bracket 14 adjacent foot 66 thereby to prevent continued rotation of the wheel in said clockwise direction.

There is thus provided a novel anti-theft device which is easily mounted to the steering wheel of a vehicle and, when mounted, restricts rotational movement of the wheel and protects the key housing on the steering column.

While a preferred embodiment of the invention has been shown and described in detail, it will be readily understood and appreciated that numerous omissions, changes and additions may be made without departing from the spirit and scope of the present invention.

I claim:

1. An anti-theft device adapted to be mounted to a steering wheel of a vehicle wherein the wheel has a hub, a spoke extending radially out from the hub, a steering column extending axially back from the hub, and a key housing on the steering column, the device comprising:
   a yoke member adapted to be positioned on the steering column; and
   a bent bracket member having a first portion adapted to be mounted to said yoke member and having a second portion adapted to engage with the spoke of the wheel;

said yoke member including a U-band segment having upper and lower legs and a base, said upper and lower legs extending respectively across upper and lower surfaces of the steering column;

said yoke member further including a positioning bracket adapted to be received in a space between the hub and the steering column to provide axial positioning of said device on the steering wheel to which said device is mounted;

said bracket member having a vertical leg that includes said first portion of said member and having a foot that includes said second portion of said member; and said bracket member further having a segment connected said foot and said vertical leg, said connecting segment having a forwardly extending portion adapted to be engaged by the spoke to prevent rotation of the steering wheel in a predetermined direction.

2. The anti-theft device of claim 1, further comprising coupling means to connect the vertical leg of said bracket member to the U-band segment of said yoke member.

3. The anti-theft device of claim 1, wherein each leg end of said U-band segment has an opening therein, said first portion of said vertical leg of said bracket member having an end extending through each of said openings, and said end of said vertical leg having an opening therein adapted to receive a hasp portion of a lock.

4. The anti-theft device of claim 3, further comprising coupling means to connect the vertical leg of said bracket member to the U-band segment of said yoke member.

5. The anti-theft device of claim 4, wherein said coupling means comprises a slot in said vertical leg of said bracket member, said slot being disposed to receive an edge portion defining the opening in said upper leg of said U-band segment when said bracket member is mounted to said yoke member.

6. The anti-theft device of claim 1, further comprising a key housing shield mounted on said yoke member, said shield adapted to cover the key housing on the steering column of the wheel on which said device is mounted.

7. The anti-theft device of claim 6, wherein said key housing shield is mounted on said base of said U-band segment.

8. The anti-theft device of claim 2, further comprising a positioning bracket mounted on said yoke member, said bracket adapted to be received in a space between the hub and the steering column to provide axial positioning of said device on the steering wheel to which said device is mounted.

9. The anti-theft device of claim 1, wherein said positioning bracket is mounted on said base of said U-band segment.

10. The anti-theft device of claim 1, wherein the hub has a collar extending axially back in the space between the hub and the steering column, said positioning bracket having an edge adapted to contact the hub collar to provide lateral positioning of said device on the steering wheel to which said device is mounted.

11. The anti-theft device of claim 1, wherein the upper leg of said U-band segment is positioned to contact an upper surface of the steering column to provide vertical positioning of said device on the steering wheel to which said device is mounted.

12. The anti-theft device of claim 1, wherein said foot of said bent bracket member is positioned to fit behind and capture the spoke of the steering wheel upon engagement of the spoke with said connecting segment of said bracket member.

13. The anti-theft device of claim 1, wherein the wheel has a plurality of spokes extending radially out from the hub, said connecting segment of said bent bracket member being disposed to be engaged by one of the spokes to prevent rotation of the steering wheel in said predetermined direction and to be engaged by another one of the spokes to prevent rotation of the wheel in a direction opposite to said predetermined direction.

14. An anti-theft device adapted to be mounted to a steering wheel of a vehicle wherein the wheel has a hub, a spoke extending radially out from the hub, a steering column extending axially back from the hub, and a key housing on the steering column, the device comprising:

a yoke member adapted to be positioned on the steering column; and a bent bracket member having a first end adapted to be mounted to said yoke member and having a second end adapted to engage with the spoke of the wheel;

said yoke member including a U-band segment having upper and lower legs and a base, each of said upper and lower legs extending across respective upper and lower surfaces of the steering column and having an opening in the respective end portions thereof;

a key housing shield mounted on said yoke member to cover the key housing on the steering column of the wheel on which said device is mounted;

said bracket member having a vertical leg that includes said first end of said member and having a foot that includes said second end of said member;

said first end of said bracket member extending through the openings in the leg ends of said U-band segment and having an opening adapted to receive a hasp portion of a lock;

said first end of said bracket member further having a slot located beneath the opening therein, said slot being disposed to receive an edge portion defining the opening in said upper leg of said U-band segment when said bracket member is mounted to said yoke member; and said bracket member further having a segment connecting said foot and said vertical leg, said connecting segment having a forwardly extending portion adapted to be engaged by the spoke to prevent rotation of the steering wheel in a predetermined direction.

15. The anti-theft device of claim 14, further comprising a positioning bracket mounted on said yoke member, said bracket adapted to be received in a space between the hub and the steering column to provide axial positioning of said device on the steering wheel to which said device is mounted.

16. The anti-theft device of claim 15, wherein the hub has a collar extending axially back in the space between the hub and the steering column, said positioning bracket having an edge adapted to contact the hub collar to provide lateral positioning of said device on the steering wheel to which said device is mounted.

17. The anti-theft device of claim 14, wherein the upper leg of said U-band segment is positioned to contact an upper surface of the steering column to provide vertical positioning of said device on the steering wheel to which said device is mounted.

18. The anti-theft device of claim 14, wherein said foot of said bent bracket member is positioned to fit behind and capture the spoke of the steering wheel upon engagement of the spoke with said connecting segment of said bracket member.

19. The anti-theft device of claim 14, wherein the wheel has a plurality of spokes extending radially out from the hub, said connecting segment of said bent bracket member being disposed to be engaged by one of the spokes to prevent rotation of the steering wheel in said predetermined direction and to be engaged by another one of the spokes to prevent rotation of the wheel in a direction opposite to said predetermined direction.

20. The anti-theft device of claim 14, wherein the first end and the second end of said bracket member are off-set relative to each other.

21. An anti-theft device adapted to be mounted to a steering wheel of a vehicle wherein the wheel has a hub, a spoke extending radially out from the hub, a steering column extending axially back from the hub, and a key housing on the steering column, the device comprising:
   a yoke member adapted to be positioned on the steering column; and
   a bent bracket member having a first end adapted to be mounted to said yoke member and having a second end adapted to engage with the spoke of the wheel;
   said yoke member including a U-band segment having upper and lower legs and a base, said upper and lower legs extending respectively across upper and lower surfaces of the steering column;
   said bracket member having a vertical leg that includes said first end of said member and having a foot that includes said second end of said member;
   coupling means to connect the vertical leg of said bracket member to the U-band segment of said yoke member;
   said coupling means comprising a slot in said vertical leg of said bracket member, said slot being disposed to receive an edge portion defining the opening in said upper leg of said U-band segment when said bracket member is mounted to said yoke member; and
   said bracket member further having a segment connecting said foot and said vertical leg, said connecting segment having a forwardly extending portion adapted to be engaged by the spoke to prevent rotation of the steering wheel in a predetermined direction.

22. The anti-theft device of claim 21, wherein each leg end of said U-band segment has an opening therein, said first end of said vertical leg of said bracket member extending through each of said openings, and said first end of said vertical leg having an opening therein adapted to receive the hasp of a lock.

23. The anti-theft device of claim 21, further comprising a key housing shield mounted on said yoke member, said shield adapted to cover the key housing on the steering column of the wheel on which said device is mounted.

24. The anti-theft device of claim 8, wherein the hub has a collar extending axially back in the space between the hub and the steering column, said positioning bracket having an edge adapted to contact the hub collar to provide lateral positioning of said device on the steering wheel to which said device is mounted.

* * * * *